United States Patent
Isoyama (10) Patent No.: US 8,356,241 B2
(45) Date of Patent: Jan. 15, 2013

(54) RELAY CONNECTION UNIT MOUNTED IN VEHICLE

(75) Inventor: Yoshikazu Isoyama, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 796 days.

(21) Appl. No.: 12/450,106

(22) PCT Filed: Mar. 28, 2008

(86) PCT No.: PCT/JP2008/056039
§ 371 (c)(1),
(2), (4) Date: Sep. 11, 2009

(87) PCT Pub. No.: WO2008/126698
PCT Pub. Date: Oct. 23, 2008

(65) Prior Publication Data
US 2010/0031106 A1 Feb. 4, 2010

(30) Foreign Application Priority Data
Apr. 5, 2007 (JP) ................................. 2007-098957

(51) Int. Cl.
*H04L 1/00* (2006.01)
(52) U.S. Cl. ....................................... 714/807; 370/389
(58) Field of Classification Search .................. 714/807; 370/389
See application file for complete search history.

(56) References Cited

U.S. PATENT DOCUMENTS

| | | | | |
|---|---|---|---|---|
| 6,381,714 | B1 * | 4/2002 | Tomita et al. | 714/712 |
| 6,747,365 | B2 * | 6/2004 | Reinold et al. | 307/9.1 |
| 6,934,612 | B2 * | 8/2005 | Remboski et al. | 701/36 |
| 7,024,257 | B2 * | 4/2006 | Pearce et al. | 700/72 |
| 7,272,496 | B2 * | 9/2007 | Remboski et al. | 701/1 |
| 7,570,597 | B2 * | 8/2009 | Remboski et al. | 370/248 |
| 8,265,087 | B2 * | 9/2012 | Noumi et al. | 370/401 |
| 2003/0117298 | A1 | 6/2003 | Tokunaga et al. | |
| 2004/0120333 | A1 | 6/2004 | Geddes et al. | |
| 2011/0149970 | A1 * | 6/2011 | Jeong et al. | 370/392 |

FOREIGN PATENT DOCUMENTS

| | | |
|---|---|---|
| JP | A-2002-016614 | 1/2002 |
| JP | A-2007-028377 | 2/2007 |
| JP | A-2007-038904 | 2/2007 |
| JP | A-2007-043256 | 2/2007 |
| JP | A-2007-081484 | 3/2007 |

OTHER PUBLICATIONS

German Office Action issued German Patent Application No. 112008000795.0 dated Jul. 18, 2011 (with translation).

* cited by examiner

*Primary Examiner* — Stephen M Baker
(74) *Attorney, Agent, or Firm* — Oliff & Berridge, PLC (57) ABSTRACT

A Relay connection unit which is connected with a plurality of buses and relays a message to a different bus. The relay connection section comprises a data check section for detecting an error in a data section of a received message, a storage section for storing set data or/and the previously sent data for message rewriting use for each ID (identifier) attached to the message, and a data rewrite portion for rewriting the data section of the message in which the error is detected into the set data or the previously sent data stored in the storage section.

8 Claims, 9 Drawing Sheets

Identifier storage portion = Routing table : ROM24-1

| Identifier | Transfer direction |
|---|---|
| 100 | CAN1 |
| 110 | CAN2 |
| 1101 | CAN1 |

Fig. 3B

Break point discrimination data, default value : ROM24-2

| Identifier | DLC | Data section | |
|---|---|---|---|
| | | Default value | Break point |
| 100 | 8 | | |
| 110 | 4 | | |
| 1101 | 2 | | |

Fig. 4

| ID(Identifier) | DLC | Data | | |
|---|---|---|---|---|
| | | Set data (Hexadecimal notation) | Previously sent data (Hexadecimal notation) | Break point discrimination data (Expressed in bit) |
| 100 | 8 | | aaccee1133557799 | 1111111110000110........00001111 ← D3 |
| 110 | 4 | | bbccddee00000000 | 1111111100001110........00000000 |
| 1101 | 2 | 1234000000000000 ← D1 | ....... ← D2 | 1111111111111110........00000000 |

| ID(Identifier) | DLC | Data | | |
|---|---|---|---|---|
| | | Set data (Hexadecimal notation) | Previously sent data (Hexadecimal notation) | Break point discrimination data (Expressed in bit) |
| 100 | 8 | 1122334455667788 | aaccee1133557799 | 1111111110000000........00000000 |
| 100 | 8 | | aaccee1133557799 | 0000000001111000........00000000 |
| 100 | 8 | 1122334455667788 | | 0000000000000110........00000000 |
| ... | | | | |
| 100 | 8 | 1122334455667788 | | 0000000000000000........00001111 |
| 110 | 4 | | bbccddee00000000 | 1111111000000000........00000000 |

← D1    ← D2    ← D3

RELAY CONNECTION UNIT MOUNTED IN VEHICLE

TECHNICAL FIELD

The present invention relates to a relay connection unit to be mounted on a car. More particularly the present invention relates to the relay connection unit rewriting the data of a message in which an error has been detected into a suitable data to relay the message as a complete message.

BACKGROUND ART

A communication system to be mounted on a car is conventionally adopted in which communication lines (hereinafter referred to as bus) connected to electronic control units (ECU: Electronic Control Unit) controlling the operation of appliances mounted on the car are connected with a relay connection unit such as a gateway to send and receive messages among the ECUs.

In recent years, with an increase in the function of the car, the number of the ECUs has increased and the number of messages to be sent and received among the ECUs has rapidly increased. Therefore there is a demand that messages are efficiently sent and received among the ECUs and that a communication load factor of the bus is decreased.

To decrease the communication load, it is conceivable that stopping the transmission of an incomplete message in which an error has occurred is effective. In this case, an ECU to which the message is to be sent is incapable of periodically receiving the message.

The error message is generated in a case in which an improbable sudden change has occurred in data relating to a car speed, temperature, illuminance, rainfall, and the like; a case in which data exceeds an ordinary set range; and a case in which an improbable combination is made among a plurality of data.

Thus in Japanese Patent Application Laid-Open No. 2002-16614 (patent document 1), there is proposed the gateway which does not transfer an incomplete message in which an error has occurred.

But in the gateway proposed in the patent document 1, whether the message is to be transferred is determined after judging whether an error has occurred by checking the content of the message. Therefore unless the message is entirely received, it is impossible to determine whether the message is to be transferred.

When it is determined that the message is not transferred, an ECU at a reception side is incapable of periodically receiving the message periodically sent and received among the ECUs.

Further the gateway is capable of dealing with a store & forward method of starting transmission after the message is entirely received, but is incapable of dealing with a cut-through method, having a favorable transfer efficiency, of determining a destination to which the message is transferred when the ID (identifier) is received before the message is entirely received and starting transmission. Thus the gateway is capable of decreasing the communication load factor of the bus, but has room for improvement in sending and receiving the message efficiently.

Patent document: Japanese Patent Application Laid-Open No. 2002-16614

DISCLOSURE OF THE INVENTION

Problem to be Solved by the Invention

The present invention has been made in view of the above-described problems. It is an object of the present invention to provide a relay connection unit capable of rewriting an incomplete message having an error, sending the message as a complete message, and efficiently transferring the complete message.

Means for Solving the Problem

To solve the above-described problem, the present invention provides a relay connection unit, to be mounted on a car, which is connected to a plurality of buses to which the relay connection unit relays a message. The relay connection unit has a data check section detecting an error in a data section of a received message; a storage section storing set data or/and previously sent data for message-rewriting use for each identifier attached to the message; and a data rewrite portion rewriting a data section of the message in which the error has been detected by the data check section into the set data or the previously sent data stored in the storage section.

The storage section storing the set data or/and the previously sent data for message-rewriting use is a RAM; the storage section has a ROM storing a routing table specifying a relay destination of the received message and break point discrimination data; and the RAM and the ROM are connected to the data check section and the data rewrite portion.

When the power is turned on, the break point discrimination data of the ROM is copied to the RAM from the ROM. Thereafter the break point discrimination data is merely stored in the RAM and merely accessed to the RAM.

In the relay connection unit having the above-described construction, the set data or/and the previously sent data for message-rewriting use are stored in the storage section (RAM) for each ID of the message. Therefore with reference to the set data or the previously sent data having an ID coincident with the ID of a message in which an error has been detected, data can be rewritten.

When the data check section detects an error of the received message, the data rewrite portion rewrites the data section of an incomplete message in which the error has been detected into the set data or the previously sent data stored in the RAM, so that the received message is sent to the necessary bus as a complete message. Thereby it is possible to prevent the transmission of an incomplete message including the error. Further because the transfer of the message is not stopped, an ECU which is to receive messages periodically is capable of periodically receiving normal messages.

As the standard for detecting the error of the message, for example, the data check section is provided with the following standards:

(1) In the case where the communication protocol of the communication system is CAN and in the case where it is checked at a CRC that signals having the same level are successive in a message by 6 bits and that a staff error of not receiving the data of the message has occurred.

(2) A case in which data indicates an improbable sudden change. For example, a case in which an inside temperature and an outside temperature detected by a temperature sensor indicate an improbable sudden change, and a case in which a value detected by a car speed sensor changes more than a certain value with respect to a value detected thereby previously.

(3) A case in which a detected value is more than an upper limit value or less than a lower limit value. For example, a case in which the outside temperature detected by the temperature sensor exceeds 70° C. or is a default value.

(4) A case in which an improbable combination is made among a plurality of data. For example, only one tire reversely rotates in the rotational frequency of rotations of four wheels.

The relay connection unit of the present invention has a sending/receiving section relaying the message by using a cut-through method of starting transmission at a time when the ID of the message is received, before the data check section checks the data section of the received message entirely.

That is, the store & forward method of determining whether it is necessary to transfer the message after confirming whether the message has an error by checking the entire message data is not adopted in the present invention, but in the present invention, the cut-through method of starting transmission with the data check section checking an error of the message when the ID of the message is received is adopted. In this method, if an error is detected, the error is corrected and the corrected message is sent. Therefore it is possible to relay the message at a high speed.

As a method of transferring the message, it is possible to adopt the store & forward method of starting transmission after receiving a message entirely to send a message by correcting the data of the message having an error. But the cut-through method is preferable to send the message at a high speed.

The previously sent data stored in the RAM consists of a latest previously sent data stored by rewriting the previously sent data each time a message is sent.

By adopting the latest previously sent data to rewrite the error data, it is possible to minimize an error between correct sent data and the latest previously sent data.

When the region of the RAM is large, entire sent data or data previously sent several times may be stored to adopt the latest sent data.

It is preferable that the data section of the message to be checked by the data check section consists of a plurality of sub-data; and break point discrimination data indicating a break point of each sub-data is stored in the RAM; that the data check section detects a top bit of sub-data in which an error has been detected by the error detection portion thereof from the break point discrimination data stored in the RAM; that the data rewrite portion thereof rewrites the sub-data into the set data or the previously sent data from the top bit of the sub-data; and that the rewritten data is stored in the RAM.

In the above-described construction, the entire data section of the message in which the error has been detected is not rewritten, but only the sub-data subsequent to the sub-data in which the error has been detected is rewritten into the set data or the previously sent data. Sub-data previous to the sub-data in which the error has been detected is sent without rewriting it. Therefore the message can be efficiently sent.

When the data rewrite portion executes rewriting from the bit where the error has occurred, data before rewriting and data after rewriting are mixedly present in one sub-data. Thus there is a possibility that an inappropriate data is generated. But in the present invention, the sub-data in which the error has occurred is entirely rewritten. Therefore it is possible to securely correct the sub-data in which the error has occurred into the complete data.

In the break point discrimination data, the range of each sub-data is expressed by making bits having an equal value successive. The value of the bit is changed at a break point position of the sub-data.

For example, when the break point discrimination data is expressed as "1110011110 . . . ", it means that a range from a first bit to a third bit in which "1" is successive is a first sub-data, that a fourth bit and a fifth bit with "0" being successive are a second sub-data, and that a range from a sixth bit to a ninth bit with "1" being successive is a third sub-data. Therefore when an error is detected at an eighth bit, with reference to the break point discrimination data, it is detected that a sub-data including the eighth bit starts from the sixth bit, and data subsequent to the sixth bit is rewritten into the set data or the previously sent data.

The break point discrimination data may be provided for each sub-data to express a bit corresponding to the sub-data as "1" and a bit uncorresponding to the sub-data as "0". In this case, the break point discrimination data is stored in the storage section by expressing the break point discrimination data for detecting the range of the first sub-data as "1110000000 . . . ", by expressing the break point discrimination data for detecting the range of the second sub-data as "0001100000 . . . ", and by expressing the break point discrimination data for detecting the range of the third sub-data expressed as "0000011110 . . . ".

It is preferable that the RAM stores both the set data and the previously sent data for message-rewriting use; and that for each ID of the message or/and each sub-data, the data rewrite portion selects the set data or the previously sent data as a value to be rewritten.

In the above-described construction, in dependence on the kind of data, the data rewrite portion is capable of selecting the set data or the previously sent data as the value to be rewritten. Thereby the data rewrite portion is capable of rewriting the data of the message in which the error has been detected into appropriate data.

For example, when the data of the message relates to door locking, a key confirmation result, a shift state, and the like, it is preferable to rewrite the message in which the error has been detected into the data set in advance. In the case of data relating to a car speed, temperature, an illuminance, a rainfall, and the like, it is preferable to rewrite the message in which the error has been detected into the previously sent data.

That is, a message relating to safety such as the door locking is rewritten into data in which importance is attached to safety, when the message has an error. In the case of a message indicating a car speed, temperature, an illuminance, and the like whose content does not suddenly change, the message in which an error has occurred is rewritten into the previously sent data to maintain the content of the message by reflecting the content of the message sent latest.

Effect of the Invention

As described above, in the present invention, when the data check section detects an error of the received message, the data rewrite portion rewrites the data section of the incomplete message in which the error has been detected into the set data or the previously sent data stored in the RAM, so that the received message is sent to the necessary bus as the complete message. Thereby it is possible to prevent the incomplete message, namely, the useless message including the error from being sent.

The store & forward method of determining whether it is necessary to transfer the message after checking the entire data section of the message is not adopted in the present invention, but in the present invention, the cut-through method of starting transmission when the ID of the message is received is adopted to relay the message with an error in the data section of the message being corrected. Therefore it is possible to relay the message at a high speed.

EXPLANATION OF REFERENCE NUMERALS AND SYMBOLS

10: communication system to be mounted on car
11: bus
20: relay connection unit
23: CPU
24-1, 24-2: ROM
25: RAM
26: comparison computation section
27: data check section
28: data rewrite portion
29: error detection portion
30: ECU (Electronic Control Unit)
D: data for rewriting use
D1: set data
D2: previously sent data
D3: break point discrimination data
M: message
MD: data section
SD: sub-data
T: routing table

BEST MODE FOR CARRYING OUT THE INVENTION

The embodiments of the present invention are described below with reference to the drawings.

FIGS. 1 through 7 show the first embodiment of the present invention.

In a communication system 10 of the first embodiment to be mounted on a car (hereinafter referred to as communication system 10), communication lines (buses) CAN1, CAN2 using CAN as its communication protocol are connected to each other via a relay connection unit (gateway) 20 to construct a communication network. A plurality of ECUs 30 (electronic control units) is connected to each of the CAN 1, CAN 2. Appliances, switches, sensors, and the like to be controlled by the ECUs 30 are connected thereto, but not shown in the drawings.

Figure 1:
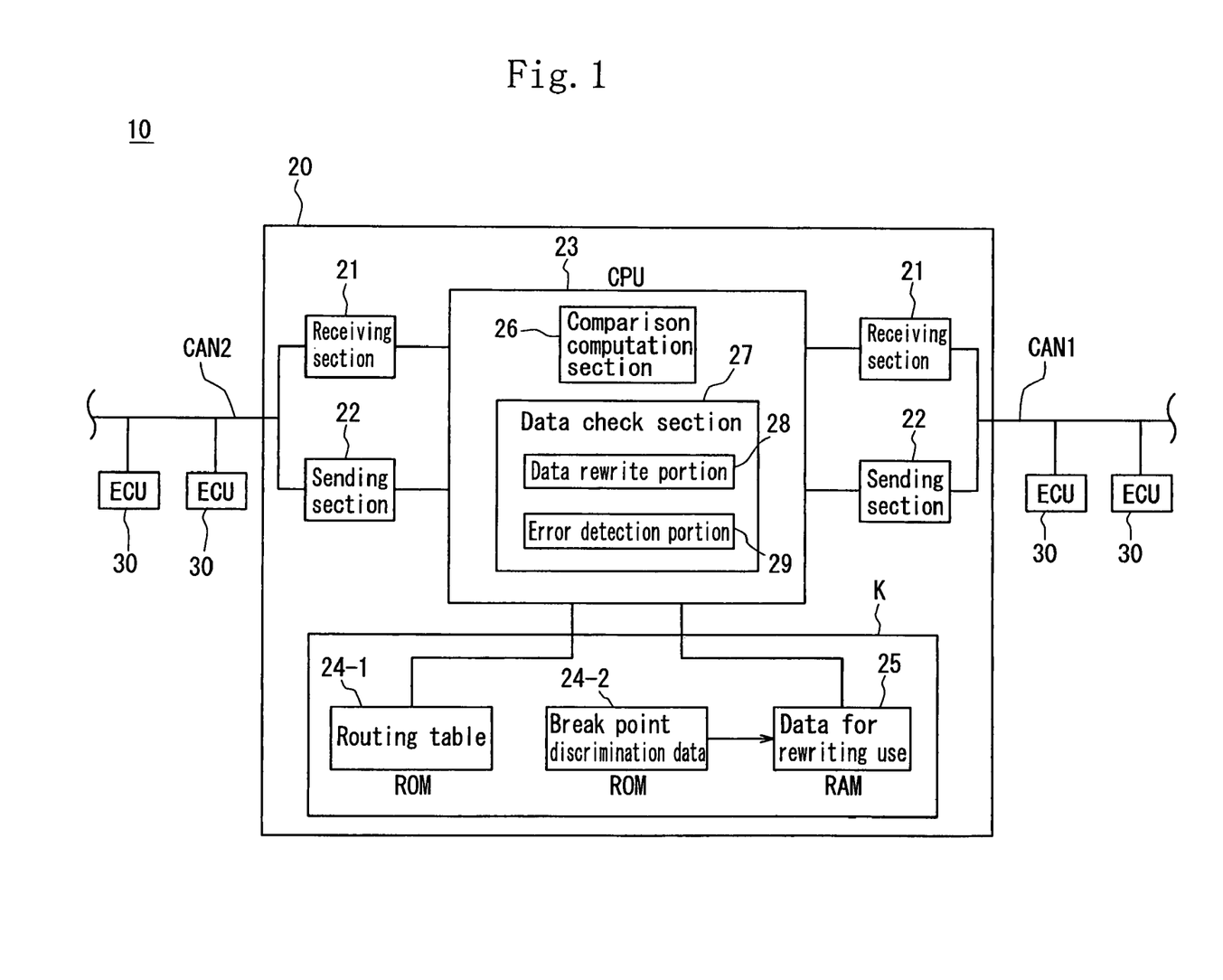
FIG. 1 shows a communication system, to be mounted on a car, in which a relay connection unit of a first embodiment of the present invention is used.
Figure 3A:
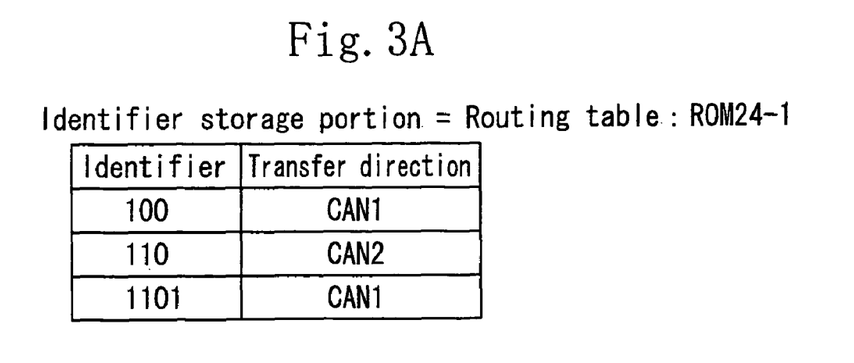
FIG. 3(A) shows a routing table storage portion.
Figure 3B:
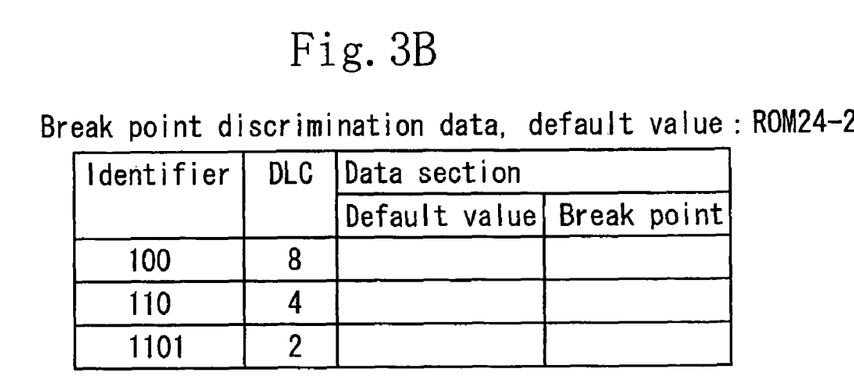
FIG. 3(B) shows a break point discrimination data storage portion.

As shown in FIG. 1, the relay connection unit 20 is connected to the CAN 1 and CAN 2 via a receiving section 21 and a sending section 22. The receiving section 21 and the sending section 22 are connected to a CPU 23. The CPU 23 is connected to a storage section K shown in FIG. 3. The storage section K has a ROM 24-1 consisting of an identifier storage portion, a ROM 24-2 consisting of a break point discrimination data storage portion, and a RAM 25 consisting of a data storage portion.

Figure 4:
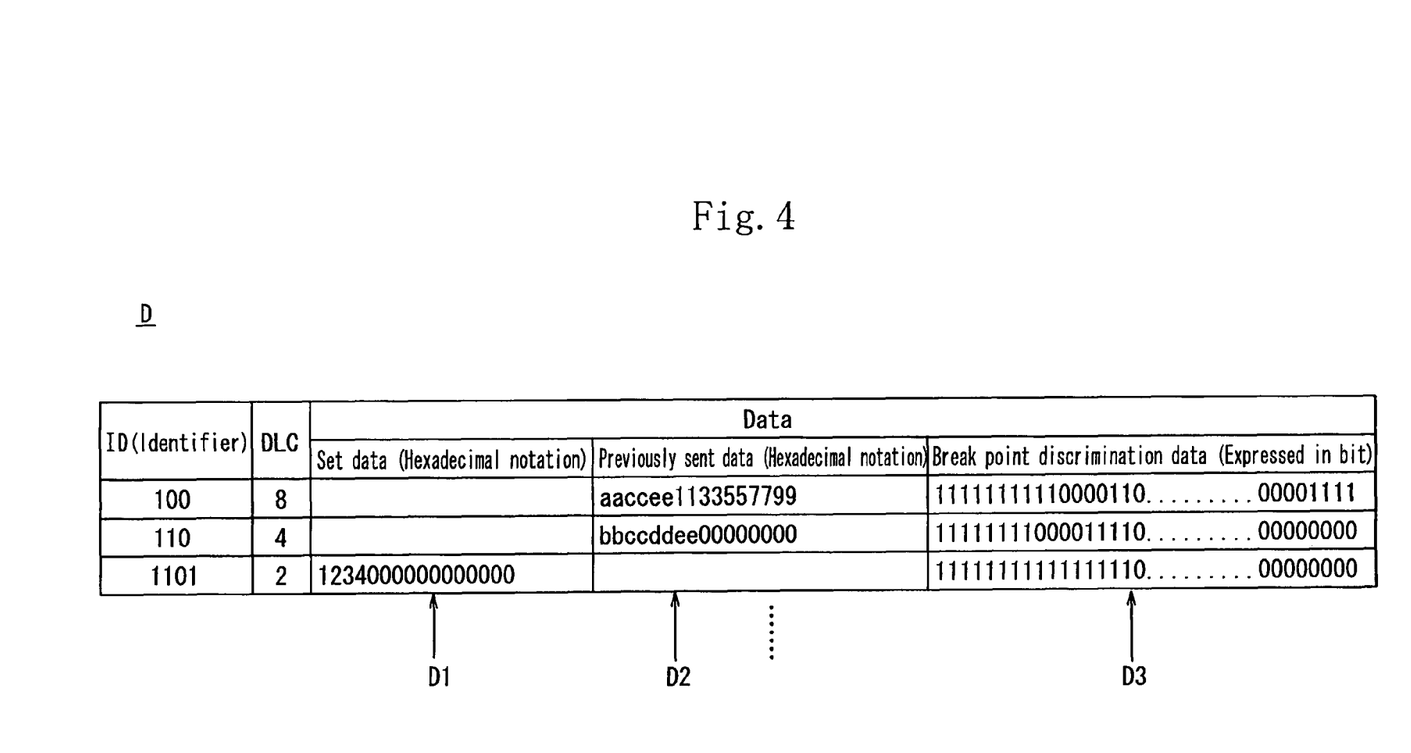
FIG. 4 shows data for rewriting use of a data storage portion.
Figure 5:
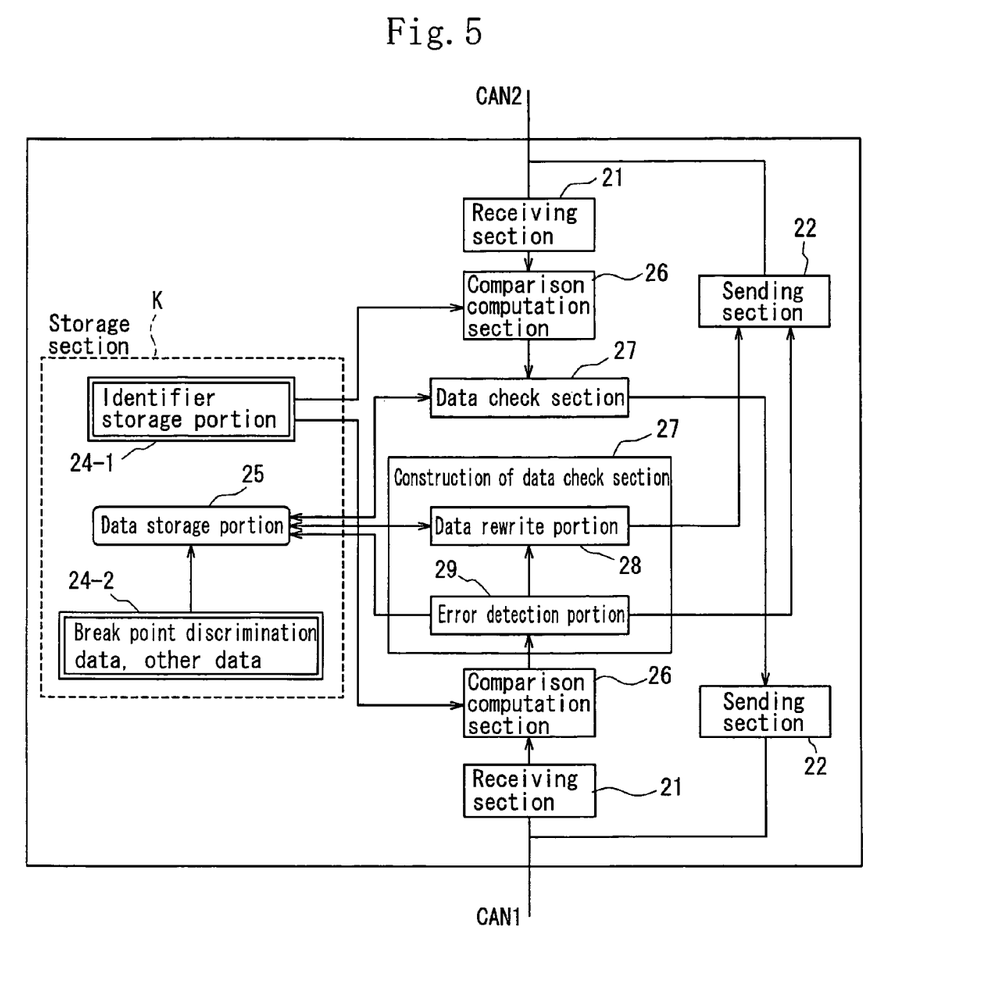
FIG. 5 is a construction view showing a correlation in data processing to be executed inside the relay connection unit.

As shown in FIGS. 4 and 5, the CPU 23 has a comparison computation section 26 determining whether it is necessary to relay a message and determining a bus through which the message is to be relayed with reference to a routing table T stored in the ROM 24-1 and a data check section 27 composed of an error detection portion 29 detecting an error of the message which is to be sent through the CAN determined by the comparison computation section 26 and a data rewrite portion 28 rewriting the message in which the error has been detected with reference to data D for rewriting use stored in the RAM 25.

As a transfer method, the comparison computation section 26 adopts a cut-through method of starting to send a message before the comparison computation section 26 receives the entire message, when it receives the ID of the message and determines a destination to which the message is to be sent.

The error detection portion 29 checks whether the errors described above at (1) through (4) have occurred at a data section of the message which is described later. For example, the error detection portion 29 checks whether there is the staff error in the CRC as described in (1), whether data indicates the improbable sudden change as described in (2), whether data exceeds the set reference value as described in (3), and whether the improbable combination is made among a plurality of data as described in (4). When an error is detected, the data rewrite portion 28 rewrites the data section of the message.

As shown in FIG. 3(A), the ROM 24-1 of the storage section K stores the routing table indicating the correlation between the identifier (ID) and the buses (CAN 1, CAN 2 . . . ) through which the message is sent. As shown in FIG. 3(B), the ROM 24-2 stores the identifier, a DLC, and the break point discrimination data. As shown in FIG. 4, the RAM 25 stores the data D for rewriting use. The data D for rewriting use includes a set data D1 for rewriting use, a previously sent data D2 for rewriting use, and a break point discrimination data D3 provided for each ID of the message.

When a power is turned on, the break point discrimination data of the ROM 24-2 is copied to the RAM 25. Thereafter the break point discrimination data is stored in the RAM. Thereby it is possible to obtain the break point discrimination data by only an access to the RAM.

The set data D1 of the RAM 24 for rewriting use and the previously sent data D2 thereof for rewriting use are the data for rewriting the message in which an error has been detected. The set data D1 is set in advance and has a constant value, whereas the previously sent data D2 is the data previously sent and rewritten each time the message is sent. The RAM 25 stores only the latest previously sent data for each ID.

Either the set data D1 or the previously sent data D2 is stored for each ID.

The set data D1 for rewriting use is stored for the data relating to a door locking, a key confirmation result, a shift state, and the like.

The previously sent data D2 for rewriting use is stored for the data relating to a car speed, parking brake information, temperature, an illuminance, a rainfall, and the like.

The break point discrimination data D3 is the data for discriminating a break point of each sub-data described at the data section of the message, as described later. The break point discrimination data D3 makes it possible to recognize the range of the data section of the message in which each sub-data is described. In rewriting the message in which the error has occurred, a data-rewriting range is determined with reference to the break point discrimination data D3.

In the break point discrimination data D3, the range of each sub-data is expressed by making bits having an equal value successive. The value of the bit is changed at a break point position of the sub-data.

Figure 2:
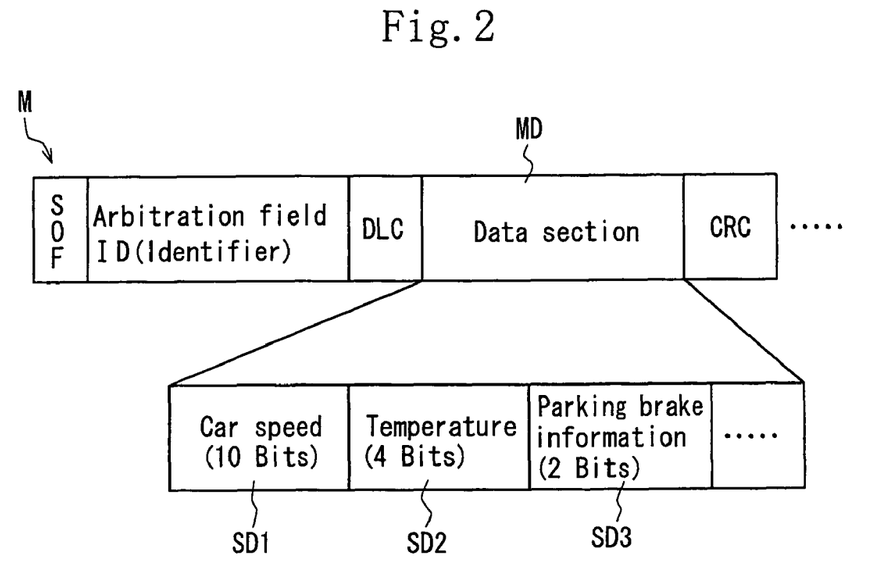
FIG. 2 shows the format of a message.

For example, as schematically shown in FIG. 2, when a data section MD of a message M (ID100) is composed of a first sub-data SD1 (10 bits) relating to a car speed, a second sub-data SD2 (four bits) relating to temperature, and a third sub-data SD3 (two bits) relating to parking brake information . . . in the order of the first sub-data SD1, the second sub-data SD2, and the third sub-data SD3, the break point discrimination data D3 is expressed as "11111111110000 110 . . . ", as shown in FIG. 4.

It can be recognized from the break point discrimination data D3 that in the data section of a message having an ID of 100, the range from the first bit to the tenth bit in which "1" is successive is a first sub-data SD1; that the range from the 11th bit to the 14th bit in which "1" is switched to "0" with "0" being successive is a second sub-data SD2; and that the 15th bit and the 16th bit in which "0" is switched to "1" with "1" being successive is a third sub-data SD3.

The message M sent and received via the buses in the communication system 10 of the first embodiment is composed of a format, as schematically shown in FIG. 2. The ID is described in an arbitration field. The data section MD is composed of a plurality of sub-data SD relating to different information.

An SOF (start of frame) indicates the start of the message. A DLC (data length code) indicates the length of the data section. A CRC indicates a field for checking an error in the transmission of the message.

The message transfer processing which is executed by the relay connection unit 20 of the communication system 10 to be mounted on a car is described below with reference to FIGS. 5 and 6.

Initially when a power is turned on, the break point discrimination data of the ROM 24-2 is copied to the RAM 25.

Figure 6:
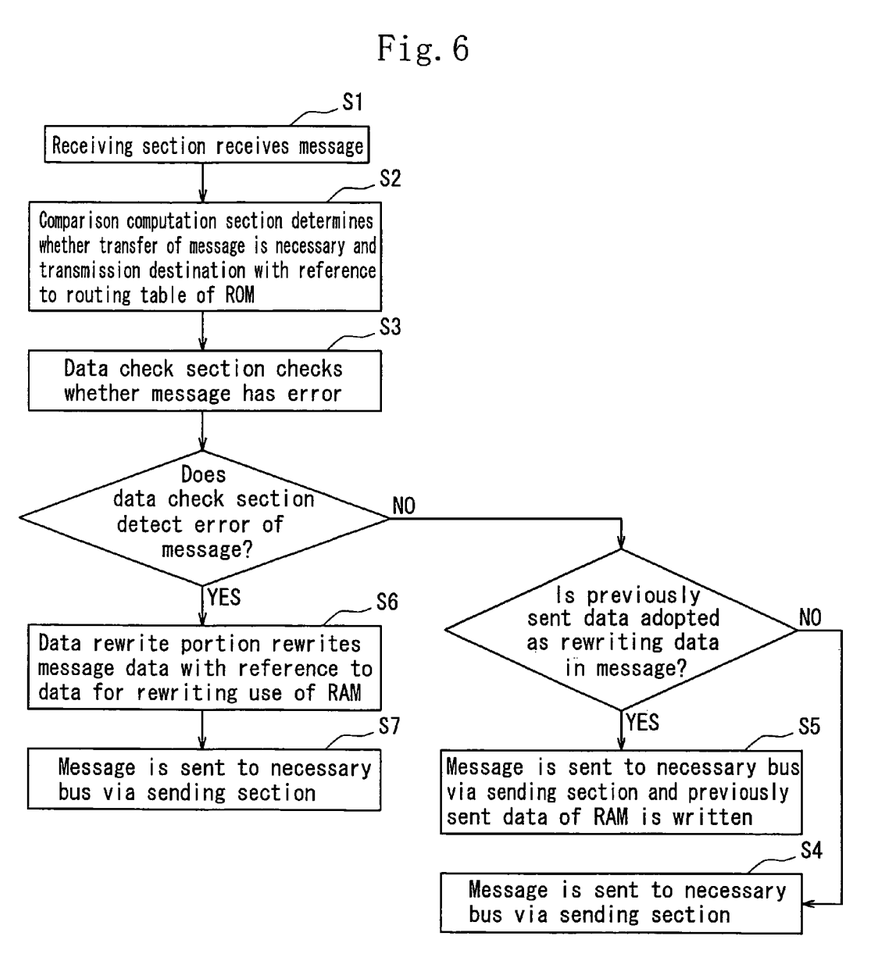
FIG. 6 is a flowchart of message transfer processing to be executed by the relay connection unit.

When the receiving section 21 of the relay connection unit 20 receives a message (step S1 of FIG. 6), the comparison computation section 26 of the CPU 23 determines whether it is necessary to transfer the message and the bus through which the message is to be sent with reference to the routing table T, shown in FIG. 3(A), which is stored in the ROM 24-1 (step S2 of FIG. 6).

Thereafter the error detection portion 29 of the data check section 27 of the CPU 23 checks whether the message to be sent has an error (step S3 of FIG. 6). A message not to be sent is discarded.

Figure 7:
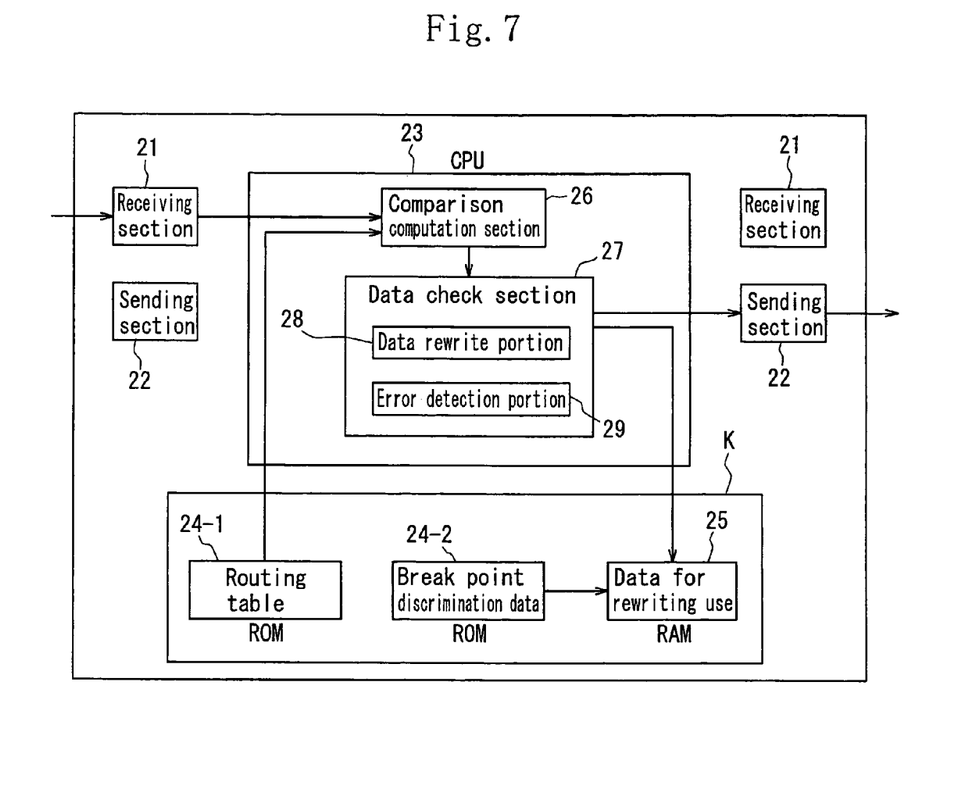
FIG. 7 shows the flow of data when an error is not detected in a message.

When the error detection portion 29 does not detect an error, the message is sent to a necessary CAN via the sending section 22, as shown in FIG. 7 (steps S4, S5 of FIG. 6).

When the error detection portion 29 detects an error and when the data section of the received message is to be rewritten into the previously sent data D2, the message is sent to the necessary CAN via the sending section 22, as described above, and the message to be sent is written to the RAM 25 as the previously sent data D2 to update the previously sent data as the latest previously sent data (step S5 of FIG. 6).

Figure 8:
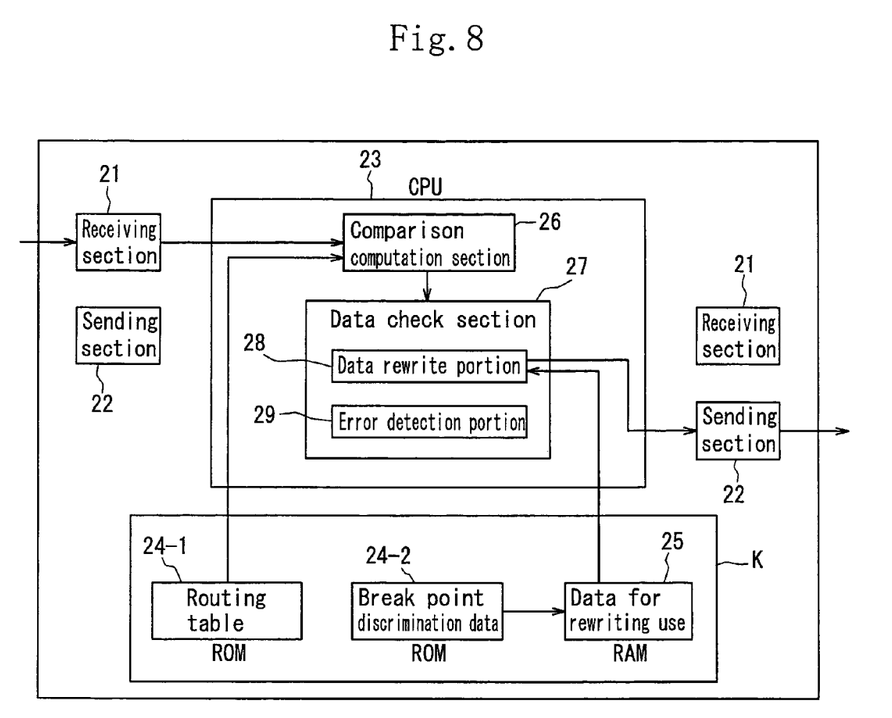
FIG. 8 shows the flow of data when an error is detected in a message.

On the other hand, when the error detection portion 29 detects that the message has an error, as shown in FIG. 8, the data rewrite portion 28 rewrites the data section of the message (step S6 of FIG. 6). At this time, with reference to the break point discrimination data D3, sub-data of the data section where the error has occurred is detected to rewrite bits in the range from a top bit of the sub-data in which the error has occurred to a last bit of the data section as the set data D1 for rewriting use or the previously sent data D2 for rewriting use.

For example, when the data section of a message having an ID of 100 is expressed as "10101010111111 . . . " and when an error is detected at the 14th bit to which the same bit is successive six times, with reference to the break point discrimination data D3 shown in FIG. 4, it is detected that the 14th bit is included in the second sub-data starting from the 11th bit, and the bits subsequent to the 11th bit which is the top bit of the second sub-data are rewritten from "1111 . . . " into the previously sent data D2, having the ID of 100, which is expressed as "0011 . . . ". The previously sent data D2 having the ID of 100 shown in FIG. 4 is expressed as "aacc . . . " by a hexadecimal notation. The above-described message is rewritten by data in a necessary range of "1010101011001100 . . . " which is expressed by a binary notation changed from "aacc . . . ".

Thereby the message in which the error has occurred is rewritten into a complete message which is sent to the necessary bus via the sending section 22 (step S7 of FIG. 6), as shown in FIG. 8.

In the above-described construction, when the error detection portion 29 detects the error of the message received by the data check section 27, the data section of the message in which the error has been detected is rewritten into the set data D1 or the previously sent data D2 stored in the RAM 25, so that the received message is sent to the necessary bus as the complete message. Thereby it is possible to prevent the transmission of an incomplete message including the error, namely, a useless message.

Whether transfer is necessary or not is not determined after checking whether the message has an error, but the error of the message is corrected on the assumption that the message is transferred. Therefore it is possible to start to send the message before the message is entirely received and efficiently send the message by using the cut-through method.

Further the data section of the message in which an error has been detected is not entirely rewritten, but only the sub-data subsequent to the sub-data in which the error has been detected is rewritten into the set data D1 or the previously sent data D2. The sub-data previous to the sub-data in which the error has been detected is sent without rewriting it. Therefore the message can be efficiently sent.

When the data rewrite portion executes rewriting from the bit where the error has occurred, data before rewriting and data after rewriting are mixedly present in one sub-data. Thus there is a possibility that an inappropriate data is generated. But in the present invention, the sub-data in which the error has occurred is entirely rewritten. Therefore it is possible to securely correct the sub-data in which the error has occurred into the complete data.

Figure 9:
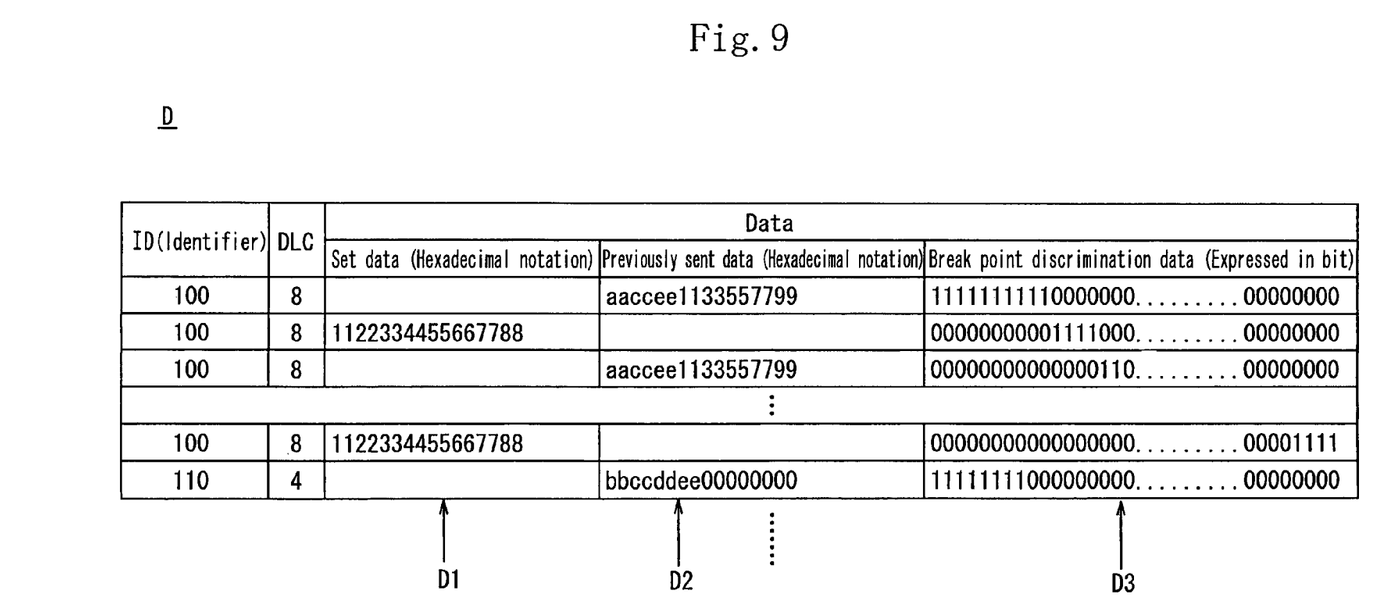
FIG. 9 shows data for rewriting use in a second embodiment.

FIG. 9 shows the second embodiment.

The data of the second embodiment for rewriting use stored in the RAM 25 is different from that of the first embodiment. The set data D1, the previously sent data D2, and the break point discrimination data D3 are provided for each sub-data.

In detail, in the break point discrimination data D3, the bit corresponding to given sub-data is "1", whereas the bit uncorresponding to the given sub-data is "0". The break point discrimination data for discriminating the first sub-data SD1 of the first embodiment is expressed as "11111111110000000 . . . ". The break point discrimination data for discriminating the second sub-data SD2 is expressed as "00000000001111000 . . . ". The break point discrimination data for detecting the range of the third sub-data SD3 is expressed as "00000000000000110 . . . ".

Therefore in the message having the ID of 100, when an error is detected at the 14th bit of the data section, the break point discrimination data having "1" at the 14th bit is searched. Because the 14th bit of the break point discrimination data of the second sub-data is "1", it is possible to detect that the error has occurred at the second sub-data. The data section of the message is rewritten from the 11th bit which is the top bit of the second sub-data.

In the above-described construction, with reference to the break point discrimination data, it is possible to efficiently execute the sub-data discrimination processing and the rewriting processing. In addition, it is possible to rewrite the sub-data into a value selected from the set data D1 and the previously sent data D2 for each sub-data. That is, even in the same message, it is possible to rewrite the first sub-data into the previously sent data and the second sub-data into the set data.

Because other constructions of the second embodiment and the operation and effect thereof are similar to those of the first embodiment, the same parts of the second embodiment as those of the first embodiment are denoted by the same reference numerals and symbols as those of the first embodiment.

What is claimed is:

1. A relay connection unit, to be mounted on a car, which is connected to a plurality of buses to which said relay connection unit relays a message, comprising:
   a data check section detecting an error in a data section of a received message;
   a storage section storing set data or/and previously sent data for message-rewriting use for each identifier attached to said message; and
   a data rewrite portion rewriting said data section of said message in which said error has been detected by said data check section into said set data or said previously sent data stored in said storage section.

2. The relay connection unit to be mounted on a car according to claim 1, further comprising a sending/receiving section relaying said message by using a cut-through method of starting transmission at a time when said identifier of said message is received, before said data check section checks said data section of said received message entirely.

3. The relay connection unit to be mounted on a car according to claim 1, wherein said storage section storing said set data or/and said previously sent data for message-rewriting use is a RAM;
   said storage section has a ROM storing a routing table specifying a relay destination of said received message and break point discrimination data; and
   said data check section has an error detection portion and a data rewrite portion and is connected to said RAM and said ROM; said error detection portion of said data check section checks an error in said data section of said message; and said data rewrite portion rewrites said data section of said message in which said error has been detected.

4. The relay connection unit to be mounted on a car according to claim 3, wherein said RAM stores both said set data and said previously sent data for message-rewriting use; and for each identifier of said message or/and each sub-data, said data rewrite portion selects said set data or said previously sent data as a value to be rewritten.

5. The relay connection unit to be mounted on a car according to claim 3, wherein said previously sent data stored in said RAM consists of a latest previously sent data stored by rewriting said previously sent data each time said message is sent.

6. The relay connection unit to be mounted on a car according to claim 5, wherein said RAM stores both said set data and said previously sent data for message-rewriting use; and for each identifier of said message or/and each sub-data, said data rewrite portion selects said set data or said previously sent data as a value to be rewritten.

7. The relay connection unit to be mounted on a car according to claim 5, wherein said data section of said message to be checked by said data check section consists of a plurality of sub-data; and break point discrimination data indicating a break point of each sub-data is stored in said RAM;
   said data check section detects a top bit of sub-data in which an error has been detected by said error detection portion thereof from said break point discrimination data stored in said RAM; and said data rewrite portion thereof rewrites said sub-data into said set data or said previously sent data from said top bit of said sub-data; and said rewritten data is stored in said RAM.

8. The relay connection unit to be mounted on a car according to claim 7, wherein said RAM stores both said set data and said previously sent data for message-rewriting use; and for each identifier of said message or/and each sub-data, said data rewrite portion selects said set data or said previously sent data as a value to be rewritten.

* * * * *